INVENTORS
Theodore A. Werkenthin
Frank M. McGeary
BY
ATTORNEY

Patented Feb. 20, 1945

2,369,697

UNITED STATES PATENT OFFICE 2,369,697

HOSE COUPLING

Theodore A. Werkenthin, Arlington, Va., and Frank M. McGeary, Washington, D. C.

Application April 1, 1943, Serial No. 481,436

6 Claims. (Cl. 285—71)

(Granted under the act of March 3, 1883, as amended April 30, 1928; 370 O. G. 757)

This invention relates to hose couplings, and it has a particular relation to couplings for fuel oil and gasoline, as well as water hose fabricated from various kinds of synthetic rubber.

In the general conversion of hose from natural rubber with a synthetic inner tube to hose constructed entirely of the various types of synthetic rubber, it has been observed that, due to a considerable difference of resiliency between natural rubber and synthetic rubber, the conventional types of expansion couplings do not perform satisfactorily on the larger type of hose. This has been overcome by the use of built-in nipples to which the couplings or flanges are secured. This is satisfactory except that the weight has been greatly increased and also if one end of the hose is injured for any reason, the whole length of the hose must be discarded. In addition, the production of hose with this type of coupling is considerably slowed up.

The principal object of the present invention is to overcome the above-mentioned objections by the provision of a novel type of light-weight hose coupling or flange which permits the "take-up" of tension and the tightening of the coupling throughout the life of the hose.

With these and other objects in view as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing means for carrying the invention into practical use, without limiting the improvements in their useful application to the particular construction, which, for the purpose of explanation, have been made the subject of illustration.

Figure 1:
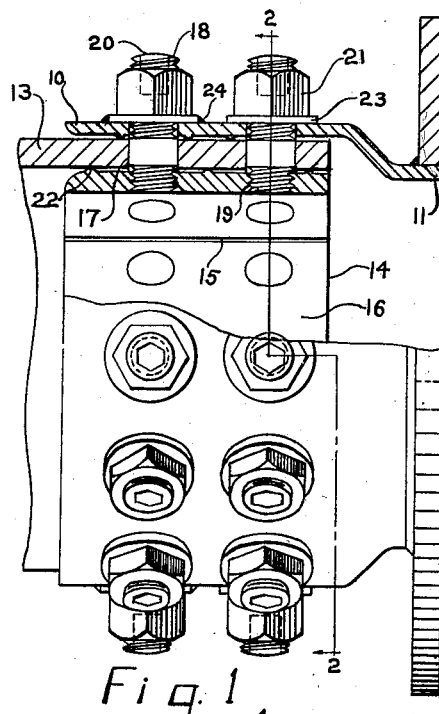
Fig. 1 is a view, partly in side elevation and partly in vertical longitudinal section, of a hose coupling embodying the invention.
Figure 2:
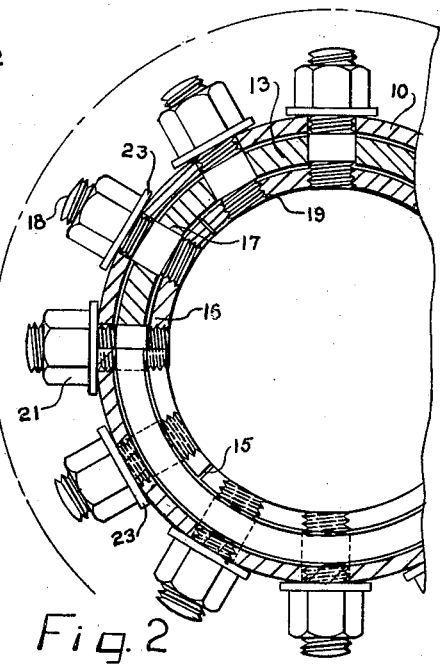
Fig. 2 is a fragmentary end view and vertical transverse section of the coupling taken on line 2—2 of Fig. 1.

Referring to the drawing, and particularly to Figs. 1 and 2 thereof, a hose coupling constructed in accordance with the invention is shown as comprising a cylindrical outer sleeve or collar 10 formed with an outer end 11 of reduced cross-sectional area to which a connecting ring flange 12 is welded or otherwise suitably secured. The sleeve 10 is adapted to be positioned around the end of a section of a gasoline or oil hose 13 fabricated from a synthetic rubber having a relatively low coefficient of resiliency. An inner sleeve 14 which is separated longitudinally, as indicated at 15, so as to form a plurality of arcuate segments 16, herein shown as four in number, is positioned within the end of the hose with its outer end substantially flush therewith. In assembly, the inner sleeve 14 is inserted first and held in place by wedge blocks (not shown) before the outer sleeve 10 is positioned on the hose. When the parts have thus been assembled, holes are drilled through the outer sleeve 10, hose 13, and segments 16 of the inner sleeve 14 at the desired spaced distances apart. These holes are then tapped and the holes in the outer sleeve 10 and the hose 13 rebored or reamed out to remove the threads therein and provide smooth openings 17 of a diameter sufficient to permit headless stud bolts 18 to be inserted freely therethrough and to be screwed into the threaded openings 19 in the segments 16 of the inner sleeve 14. The stud bolts 18 are preferably formed with hexagonal sockets 20 in their outer ends to receive the end of a wrench of similar shape.

Nuts 21 are then screwed onto the outer end of the stud bolts 18 and the assembly tightened up so as to draw the several segments 16 radially outwardly into intimate engagement with the inner surface of the hose 13 and to grip the latter securely between these segments and the outer sleeve 10 to provide a leakproof seal therebetween. In order to insure that an efficient seal is provided, the inner surface of the outer sleeve 10 and the outer surfaces of the segments 16 may be provided with a series of spaced circumferential ribs or ridges 22 which are adapted to bite into the hose when the bolts 18 are tightened. Also, with this end in view, it may be found desirable to interpose washers 23 consisting of a strand of suitably impregnated wick between the outer sleeve 10 and the nuts 21 in order to prevent leakage around the convolutions of the threads on the stud bolts 18. It may be found to be expedient to form the washers 23 of metal and to weld the same to the outer sleeve 10, as indicated at 24 in Figs. 1 and 3.

Figure 3:
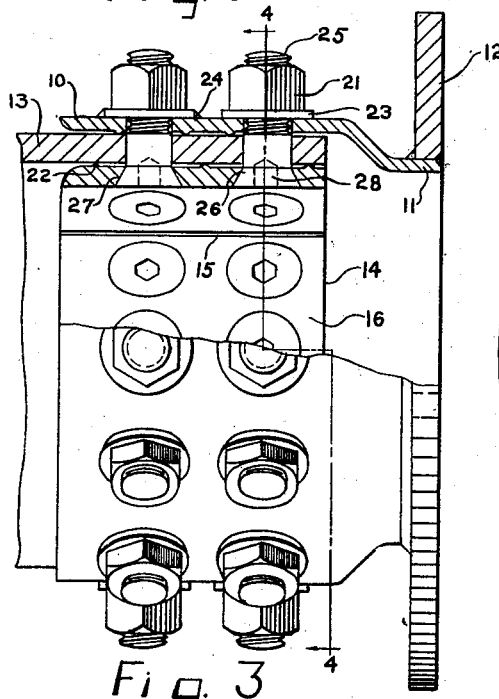
Fig. 3 is a view similar to Fig. 1 showing another form of the invention.
Figure 4:
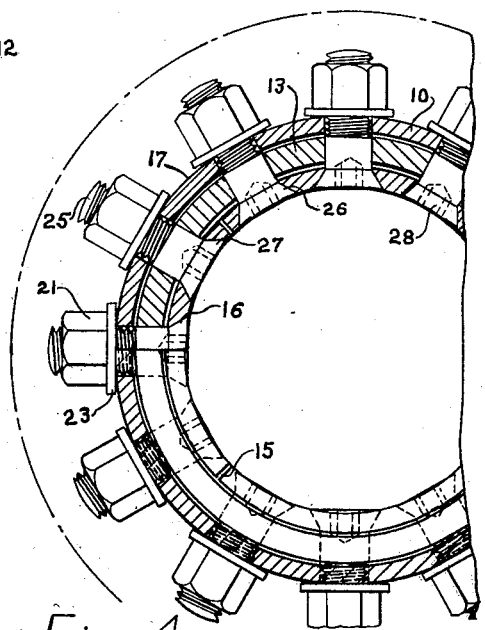
Fig. 4 is a fragmentary end view and vertical transverse section taken on line 4—4 of Fig. 3.

In Figs. 3 and 4 there is shown another adaptation of the invention wherein bolts 25 having conical inner heads 26 are employed. This construction is substantially the same as that hereinbefore described except that smooth unthreaded bores are formed in all of the parts and that the inner faces of the segments 16 are countersunk, as shown at 27 to receive the conical heads 26 of the bolts 25. The bolts 25 are prevented from turning when the nuts 21 are screwed down by means of a hexagonal wrench inserted in hexagonal sockets 28 provided in the heads 26.

It will be understood that while in the construction above described, the inner sleeve 14 is shown as being segmented with the connecting flange 12 secured to the outer sleeve 10, a reverse construction is entirely practical wherein the outer sleeve 10 is segmented and the connecting flange 12 secured to a continuous cylindrical inner sleeve.

It will be understood that, as previously stated, the above description and accompanying drawing comprehends only the general and preferred embodiment of the invention, and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

Having thus set forth and disclosed the nature of this invention, what is claimed is:

1. A hose coupling comprising inner and outer cylindrical collars adapted to be disposed within and without a hose adjacent an end thereof, one of said collars being separated longitudinally into a plurality of arcuate segments, and fastening means extending through said collars and said hose and accessible exteriorly of the assembly for drawing said collars together so as to securely grip said hose therebetween to provide a leakproof seal.

2. A hose coupling comprising inner and outer cylindrical collars adapted to be disposed within and without a hose adjacent an end thereof, one of said collars being separated longitudinally into a plurality of arcuate segments, and a plurality of stud bolts each having one end threaded into one of said collars and extending through said hose and the other collar, and a nut threaded onto the other end of each of said stud bolts and accessible exteriorly of the assembly for drawing said collars together so as to securely grip said hose therebetween to provide a leakproof seal.

3. A hose coupling comprising inner and outer cylindrical collars adapted to be disposed within and without a hose adjacent an end thereof, one of said collars being separated longitudinally into a plurality of arcuate segments and the other of said collars having a connecting flange secured to the outer end thereof, and fastening means extending through said collars and said hose and accessible exteriorly of the assembly for drawing said collars together so as to securely grip said hose therebetween to provide a leakproof seal.

4. A hose coupling comprising inner and outer cylindrical collars adapted to be disposed within and without a hose adjacent an end thereof, said inner collar being separated longitudinally into a plurality of arcuate segments, and fastening means extending through said segments, hose and said outer collar and accessible exteriorly of the assembly for drawing the former toward the latter to securely grip said hose therebetween to provide a leakproof seal.

5. A hose coupling comprising inner and outer cylindrical collars adapted to be disposed within and without a hose adjacent an end thereof, said inner collar being separated longitudinally into a plurality of arcuate segments, a plurality of stud bolts threaded into the segments of said inner collar and extending through said hose and said outer collar, and nuts threaded onto the outer ends of said stud bolts and accessible exteriorly of the assembly for drawing said segments toward said outer collar to securely grip said hose therebetween to provide a leakproof seal.

6. A hose coupling comprising inner and outer cylindrical collars adapted to be disposed within and without a hose adjacent an end thereof, said inner collar being separated longitudinally into a plurality of arcuate segments, and said outer collar having a connecting flange secured to the outer end thereof, a plurality of stud bolts threaded into the segments of said inner collar and extending through said hose and said outer collar, and nuts threaded onto the outer ends of said stud bolts and accessible exteriorly of the assembly for drawing said segments toward said outer collar to securely grip said hose therebetween to provide a leakproof seal.

THEODORE A. WERKENTHIN.
FRANK M. McGEARY.